US008032551B2

(12) United States Patent
Schneider (10) Patent No.: US 8,032,551 B2
(45) Date of Patent: Oct. 4, 2011

(54) SEARCHING DOCUMENTS FOR SUCCESSIVE HASHED KEYWORDS

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 327 days.

(21) Appl. No.: 12/463,678

(22) Filed: May 11, 2009

(65) Prior Publication Data

US 2010/0287173 A1  Nov. 11, 2010

(51) Int. Cl.
*G06F 17/30* (2006.01)
*G06F 7/00* (2006.01)

(52) U.S. Cl. .................. 707/770; 707/711; 707/747

(58) Field of Classification Search .................. 707/711, 707/747, 770
See application file for complete search history.

(56) References Cited

U.S. PATENT DOCUMENTS

| | | | |
|---|---|---|---|
| 6,581,075 B1 | 6/2003 | Guturu et al. | |
| 7,054,867 B2* | 5/2006 | Bosley et al. .......................... | 1/1 |
| 7,213,013 B1* | 5/2007 | Subramaniam et al. ...... | 707/610 |
| 7,293,014 B2* | 11/2007 | Subramaniam et al. .............. | 1/1 |
| 7,324,988 B2* | 1/2008 | Altevogt et al. ....................... | 1/1 |
| 2004/0181511 A1* | 9/2004 | Xu et al. ............................ | 707/3 |
| 2004/0205242 A1* | 10/2004 | Xu et al. ........................ | 709/245 |
| 2005/0010560 A1* | 1/2005 | Altevogt et al. .................. | 707/3 |
| 2005/0027723 A1* | 2/2005 | Jones et al. .................... | 707/100 |
| 2005/0039036 A1 | 2/2005 | Eisen | |
| 2005/0050028 A1* | 3/2005 | Rose et al. ........................ | 707/3 |
| 2007/0050429 A1 | 3/2007 | Goldring et al. | |
| 2007/0208697 A1* | 9/2007 | Subramaniam et al. .......... | 707/3 |
| 2007/0260575 A1 | 11/2007 | Robinson et al. | |
| 2008/0021908 A1* | 1/2008 | Trask et al. .................... | 707/100 |
| 2009/0177610 A1 | 7/2009 | Kawamura et al. | |
| 2010/0094877 A1* | 4/2010 | Garbe ........................... | 707/742 |

OTHER PUBLICATIONS

Gnawali, Omprakash D., "A Keyword-Set Search System for Peer-to-Peer Networks", Massachusetts Institute of Technology, Jun. 2002, 65 pages.*
Kronfol, Amr Z., "FASD: A Fault-tolerant, Adaptive, Scalable, Distributed Search Engine", Princeton University, May 6, 2002, 58 pages.*
Karasawa, Kei, "Personalized Search using Identity-Based Hashing", DIM '08, Fairfax, VA, Oct. 31, 2008, pp. 71-79.*
Ganesan, Prasanna, et al., "YAPPERS: A Peer-to-Peer Lookup Service over Arbitrary Topology", INFOCOM 2003, vol. 2, Mar. 30-Apr. 3, 2003, pp. 1250-1260.*
Risson, John, et al., "Survey of research towards robust peer-to-peer networks: Search methods", Computer Networks, vol. 50, Issue 17, Dec. 5, 2006, pp. 3485-3521.*

(Continued)

*Primary Examiner* — Robert Stevens
(74) *Attorney, Agent, or Firm* — Lowenstein Sandler PC (57) ABSTRACT

A method and system searches documents that contain an ordered pair of keywords using search indices stored in multiple storage locations. In one embodiment, a server receives the search request that includes an ordered pair of keywords. The server hashes each keyword with multiple hash functions to obtain a hash vector pair, which are used to index a chain of search indices. Hash values in the hash vector pair are used to locate the chain of search indices that are stored across multiple storage locations. The last search index in the chain provides identifiers of documents containing the ordered pair of keywords, with a distance between the keywords in the documents below a predetermined limit. The documents can be retrieved from document repositories using the identifiers.

22 Claims, 10 Drawing Sheets

OTHER PUBLICATIONS

Zhong, Ming, et al., "Correlation-Aware Object Placement for Multi-Object Operations", ICDCS '08, Beijing, China, Jun. 17-20, 2008, pp. 512-521.*

U.S. Appl. No. 11/809,635, Notice of Allowance dated Oct. 7, 2009, 16 pages.

* cited by examiner

SEARCHING DOCUMENTS FOR SUCCESSIVE HASHED KEYWORDS

TECHNICAL FIELD

Embodiments of the present invention relate to document search, and more specifically to a search engine that uses search indices distributed across federated data repositories to conduct a document search.

BACKGROUND

A search engine is generally part of an information retrieval system that retrieves information from a data repository according to a search query provided by a user. A search query can be expressed as one or more keywords. In response to the keywords, a search engine can generate a list of documents that contain the keywords.

To increase the speed of a search engine, documents in the data repository can be indexed prior to the search. The indexing operation collects, parses, and stores data relating to the documents in a search index to facilitate fast and accurate document retrieval.

A typical document retrieval system includes a front end component and a back end component. The front end component includes one or more client applications (e.g., web browsers and/or special purpose client applications) that generate search queries and transfer these search queries to the back end component. The back end component processes the search queries, looks up a search index, and accesses a data repository to retrieve the requested document.

In some enterprise document retrieval systems, the search index may contain a large amount of data that cannot be easily managed by a single server. Thus, it becomes crucial to be able to distribute this data across multiple storage locations that are managed by multiple servers in an efficient manner.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for using search indices in multiple storage locations to conduct a document search in response to a search request that includes an ordered pair of keywords. In one embodiment, a server receives the search request that includes an ordered pair of keywords. The server hashes each keyword with multiple hash functions to obtain a hash vector pair, which are used to index a chain of search indices. Hash values in the hash vector pair are used to locate the chain of search indices that are stored across multiple storage locations. The last search index in the chain provides identifiers of documents containing the ordered pair of keywords, with a distance between the keywords in the documents below a predetermined limit. The documents can be retrieved from document repositories using the identifiers. In one embodiment, the documents may be Web pages that are identified by uniform resource locators (URLs).

In one embodiment, the server implements a search engine that is capable of finding relevant documents based on keywords provided by a user. The search engine uses the chain of search indices to produce search results quickly. The search indices are distributed to multiple storage locations and can be used efficiently to search by keywords. It is not necessary to store the keywords themselves.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "hashing", "determining", "returning", "generating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
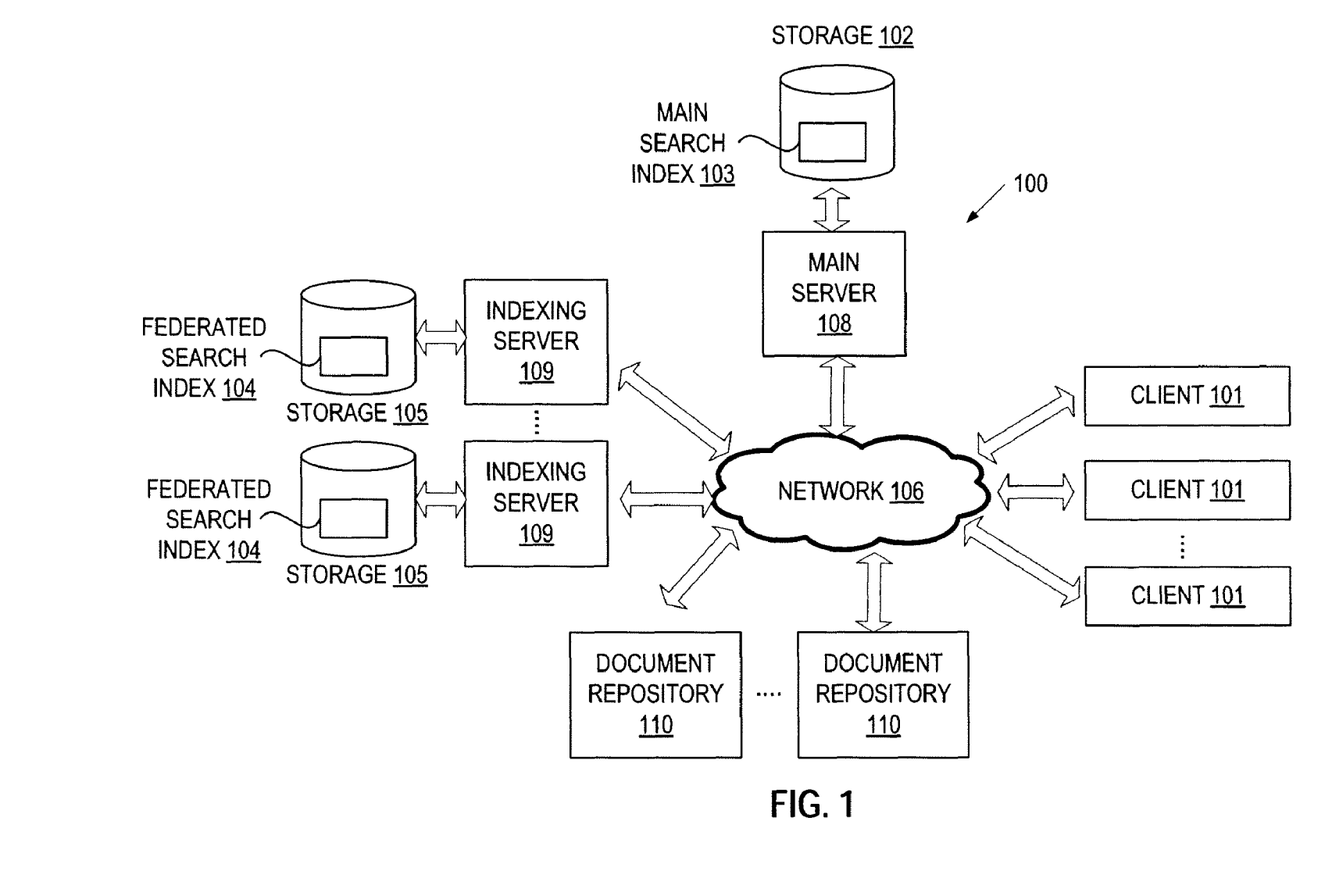
FIG. 1 is a block diagram of an exemplary architecture in which embodiments of the invention may be implemented.

FIG. 1 illustrates an exemplary network architecture 100 in which embodiments of a search engine may operate. The network architecture 100 may include client devices (clients) 101, a main server 108, a plurality of indexing servers 109 and a network 106. The clients 101 may be, for example, personal computers (PCs), mobile phones, palm-sized computing devices, personal digital assistants (PDAs), etc.

The clients 101 are coupled to the main server 108 via the network 106, which may be a public network (e.g., Internet) or a private network (e.g., Ethernet or a local area Network (LAN)). The main server 108 may reside on one or more server machines. The main server 108 serves as a search engine that receives search queries from the clients 101 and uses a main search index 103 and federated search indices 104 to find documents that satisfy the criteria specified in the search queries. For example, in response to a search query containing a keyword, the main server 108 identifies a list of documents that contain the keyword. In one embodiment, the main search index 103 is stored in storage 102 coupled to the main server 108, and each federated search index 104 is stored in storage 105 coupled to an associated indexing server 109. Alternatively, the main search index 103 and the federated search index 104 may be stored in the memory on the main server 108 and the associated indexing server 109, respectively. The main search index 103 and the federated search indices 104 can be collectively referred to as the "search indices." In one embodiment, each search index is a hash table.

The indexing servers 109 are coupled to the main server 108 via the network 106. Each indexing server 109 manages at least one search index 104 associated therewith. Each indexing server 109 may reside on one or more server machines. During a document search, the indexing server 109 receives a hash value computed from a keyword, and uses the hash value to locate an entry in its federated search index 104. The entry either points to the location of a next search index, or identifies a list of documents that contains the queried keyword.

In an alternative embodiment, the search indices used for a document search only include the federated search indices. In this embodiment, the main search index 103 is not used. After the main server 108 computes hash values from a keyword, one or more of the hash values can be used to identify one of the indexing servers 109 as storing the first search index in the chain. A number of schemes for this alternative embodiment are described in a co-pending U.S. patent application (application Ser. No. 12/463,553 filed May 11, 2009), which is incorporated herein by reference.

The network architecture 100 further comprises document repositories 110 that are coupled to the main server 108 via the network 106. The document repositories 110 store the documents to be searched by keywords. Each document in the document repositories 110 is identified by a document identifier, e.g., a URL. The document identifier is stored in the search indices in association with each keyword in the document.

The network architecture 100 distributes the federated search indices 104 across multiple storage locations, such that the size of each search index 104 is manageable by a single server. The indexing servers 109 and the associated storage 105 can be managed by autonomous and cooperating entities. By "autonomous," it means that the cooperating entities are not necessarily controlled by the same enterprise. For example, multiple independent companies may team up by pooling their resources together to allow document searches in a "federated system" or "federated data repositories." In the embodiment of FIG. 1, a federated system may include the indexing servers 109 and storage 105, which belong to different companies that form an agreement to share their resources for the purpose of performing a document search. When the client 101 submits a search request to the main server 108, the main server 108 determines which indexing server 109 to use, and that indexing server 109 looks up the information in its federated search index 104 to determine the next location to search. The clients 101 do not have to be aware of the locations of the federated search indices 104 involved in a search. Instead, the main server 108 provides a unified interface to the clients 102 by performing the necessary computations for the clients 102 to determine the storage locations of the federated search indices 104.

Figure 2:
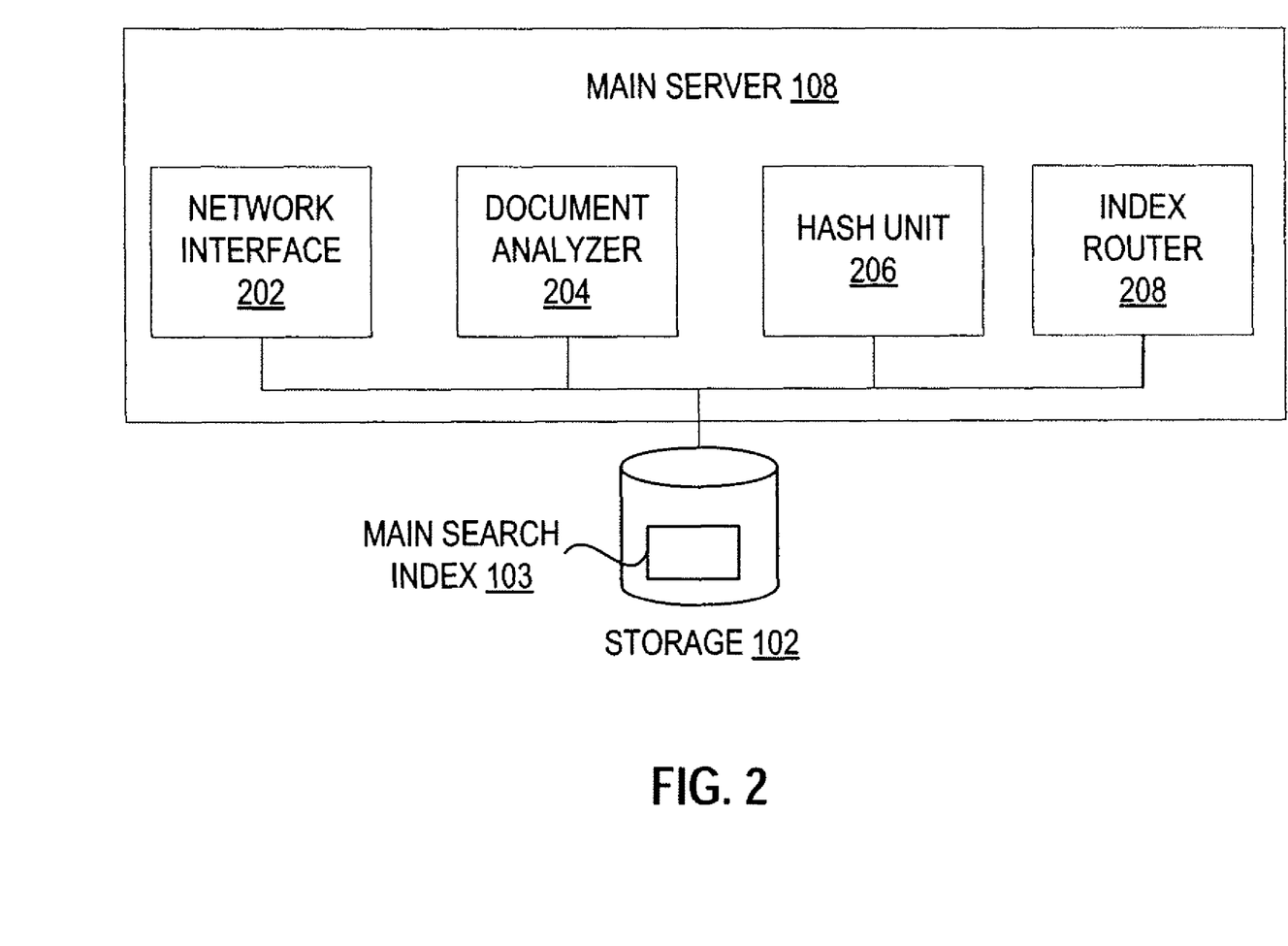
FIG. 2 is a block diagram of one embodiment of a main server.

FIG. 2 is a block diagram of one embodiment of the main server 108. The main server 108 includes a network interface 202, a document analyzer 204, a hash unit 206, and an index router 208. The main server 108 is coupled to storage 102 that stores the main search index 103.

In one embodiment, the network interface 202 is responsible for receiving search requests from the clients 101 and sending search results to the clients 101. The network interface 202 is also responsible for communication with the indexing servers 109. The document analyzer 204 is responsible for analyzing documents to associate the documents with keywords. The hash unit 206 hashes each keyword in the search request with multiple hash functions to generate a sequence of hash values. The hash values are used to as keys to index a chain of search indices. Using the hash values and the search indices, the identifiers of the documents that contain the keyword can be found. The index router 208 is responsible for setting up and distributing the search indices across different storage locations at an initial setup phase. The operations of main server 108 will be discussed in more detail below with reference to FIGS. 4, 5, 7 and 8.

The hash unit 204 includes software, hardware, or a combination of both, to perform the hash operations. In one embodiment, each hash function implements a distinct hash algorithm (e.g., Jenkins One-at-a-time hash or SHA-1). Alternatively, each hash function implements the same hash algorithm modulo a different prime number. The hash algorithms are not necessarily cryptographic hashes. In one embodiment, the hash algorithms are chosen to be fast, small, integer hashes that generate hash values of small sizes (e.g., 8-bit values). Limiting the size of hash values reduces the size of each search index, such that each search index can be easily managed by a single server. However, collisions occur when mapping a large collection of keywords to a small set of hash values. Collisions caused by the use of small hash values can be eliminated or optimized by hashing the same keyword multiple times, each time with a different hash function. In one embodiment, the keywords are not necessarily hashed the same number of times. That is, keywords that are prone to collisions may be hashed more times than other keywords.

Figure 3:
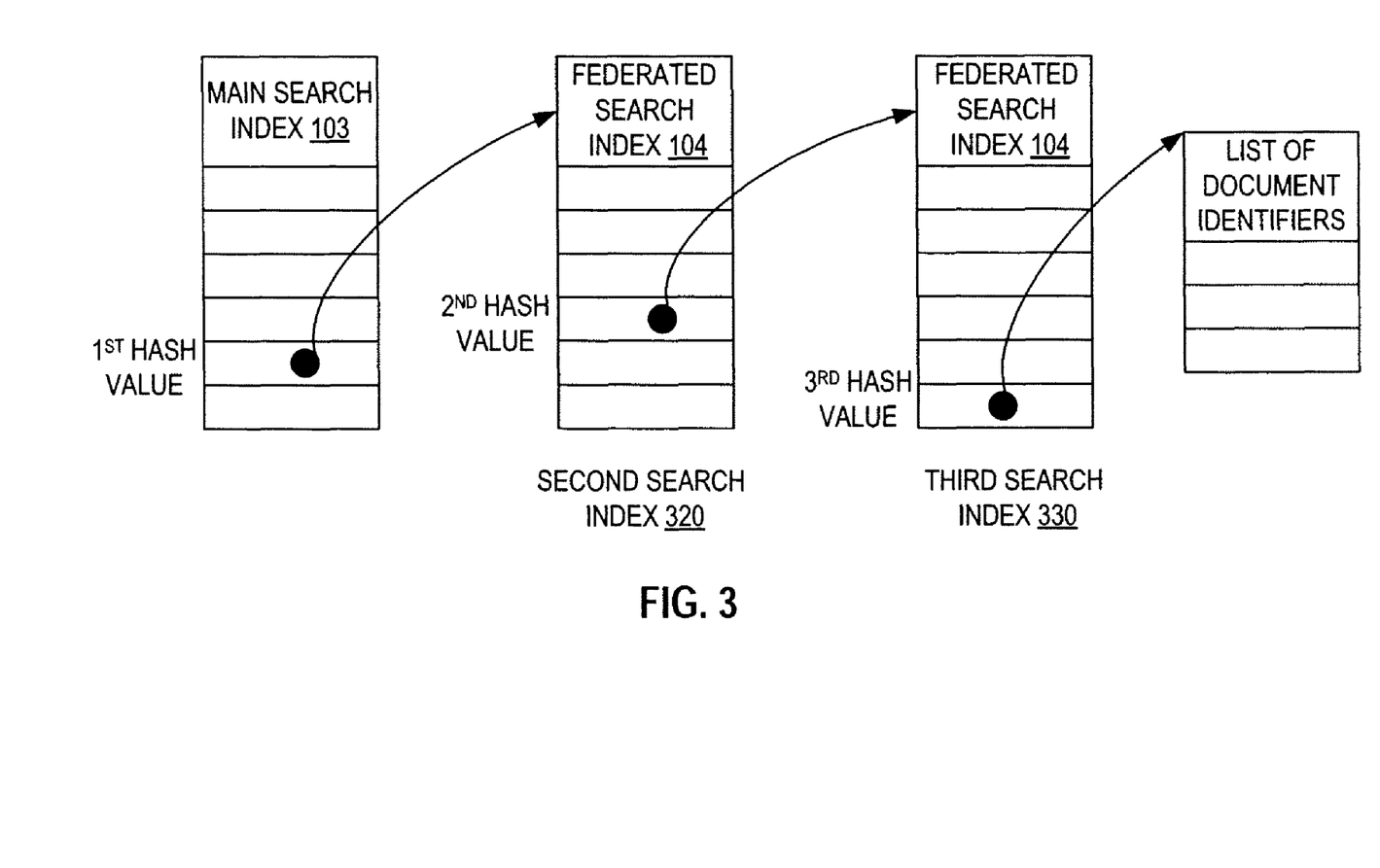
FIG. 3 illustrates an example of a chain of search indices that corresponds to an individual keyword in accordance with one embodiment of the invention.

FIG. 3 illustrates an example of forming a chain of search indices using hash values. After the main server 108 generates a sequence of hash values from a keyword, the first hash value in the sequence (also referred to as the lowest level hash) is used as a key to look up an entry in the main search index 103, where the entry provides a reference to the storage location of a second search index 320 (e.g., one of the federated search indices 104). The second hash value is used as a key to look up an entry in the second search index 320, and that entry provides a reference to the storage location of a third search index 330 (e.g., another federated search index 104). The third hash value in the sequence (also referred to as the highest level hash) is used as a key to look up an entry in the third search index 330, and that entry stores or points to a list of document identifiers that contains the keyword in the search request. Thus, the hash values are used to index a chain of search indices. Generally, the chain is acyclic to avoid indefinite loops during a search. Although three hash values are shown in FIG. 3, it is understood that any number of hash values can be used to form a chain of search indices that are stored in multiple storage locations.

In one embodiment, keywords that are hashed to the same first hash value but to different second hash values can be mapped to different entries in the same second search index. Keywords that have the same first and second hash values can be mapped to different entries in a third search index. Thus, by increasing the level of hashes, collisions of keywords can be eliminated. Finally, identifiers for the documents containing a given keyword are stored in, or referenced by, the last search index in the chain. To accommodate all of the searchable keywords with minimal or zero collision, multiple search indices are used at each level of the hash except the lowest level. That is, more than one second search index 320 and more than one third search index 330 are used. The main search index 104 is the only search index used at the lowest level hash. The number of search indices associated with the highest level hash (e.g., the third search index 330 of FIG. 3) is determined by the number of keywords to be searched, such that the total number of entries in the highest level search indices is at least as large as the total number of the keywords. If two keywords have the same sequence of hash values, the number of hash functions for hashing these keywords can be increased to resolve collisions.

Figure 4:
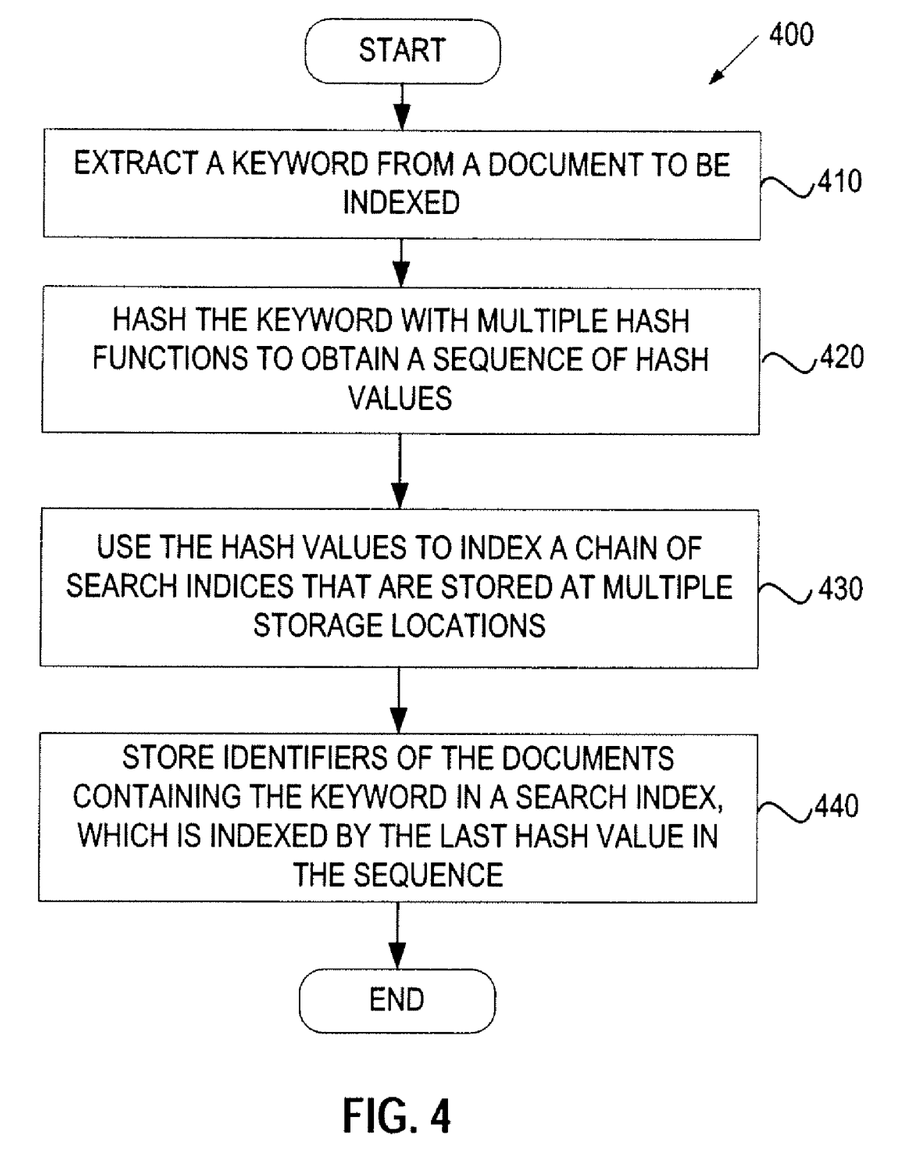
FIG. 4 is a flow diagram of one embodiment of a method for setting up search indices to facilitate document search.

FIG. 4 is a flow diagram illustrating one embodiment of a method 400 for setting up the search indices for document search. The method 400 may be performed by processing logic 926 of FIG. 9 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the main server 108 of FIG. 1.

Referring to FIG. 4, the method 400 begins with the processing logic 926 extracting individual keywords from a document to be indexed (block 410). The keywords can be any common words that are likely to be in search requests. For each individual keyword, the processing logic 926 hashes the keyword with multiple hash functions to generate a sequence of hash values (block 402). For example, using Jenkins "One-at-a-time" hash, modulo primes 233, 239, 241, 251, the keyword "rat" generates a sequence of hash values (73, 53, 236, 49). The hash values are used to index a chain of search indices that are stored at multiple storage locations (block 430), such that the lookup result for the nth hash value provides the location to search for the (n+1)th hash value. The processing logic 926 stores the identifiers of the document in an entry of the last search index, where the entry is pointed to by the last hash value in the sequence (block 440). The operations of blocks 420-440 can be repeated for each individual keyword extracted from the document. The processing logic 926 may continue to index the next document until all of the documents are processed.

Figure 5:
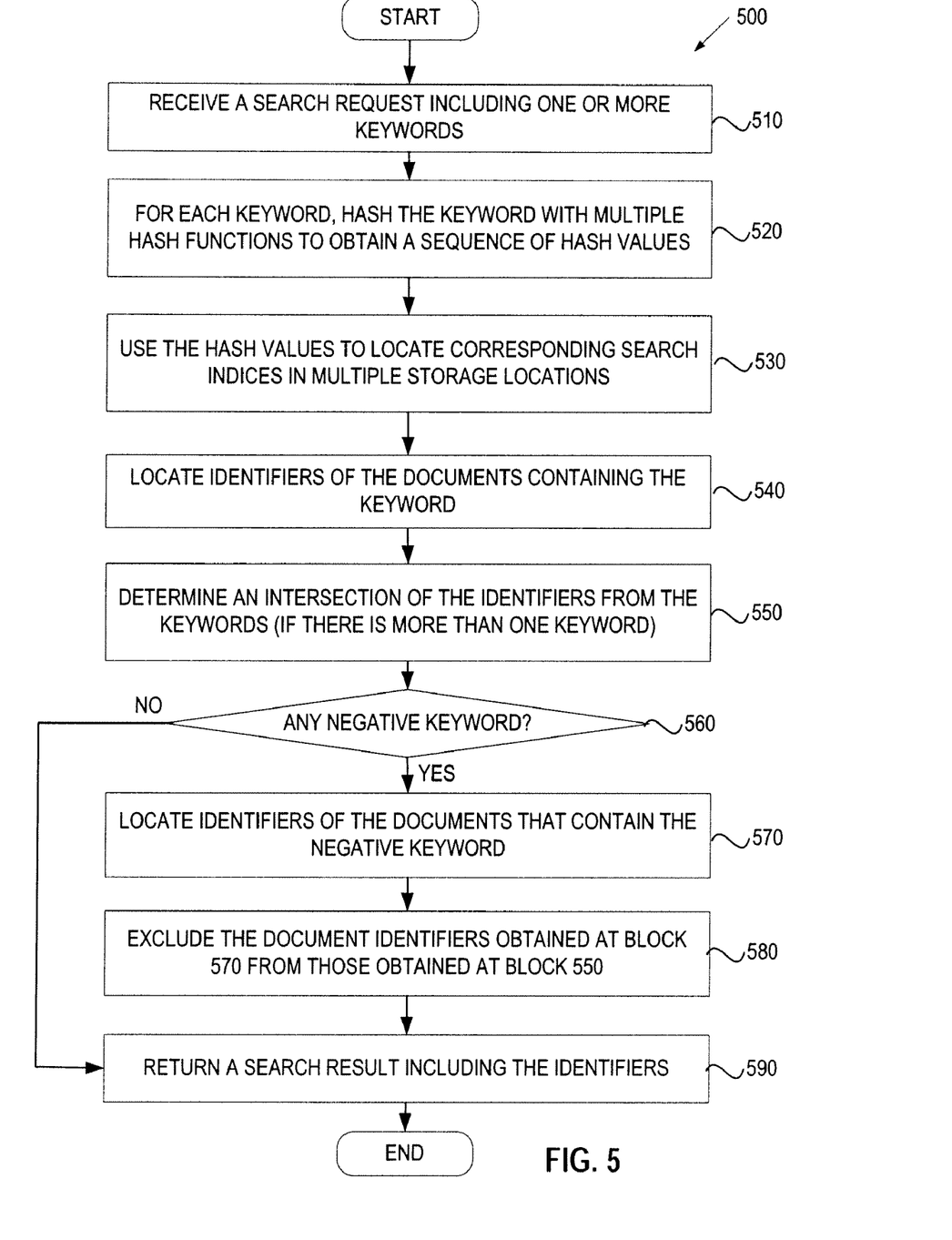
FIG. 5 is a flow diagram of one embodiment of a method for performing document search using the search indices that are set up in FIG. 4.

FIG. 5 is a flow diagram of one embodiment of a method 500 for performing a document search in response to a search request. The method 500 may be performed by processing logic 926 of FIG. 9 that may comprise hardware (e.g., circuitry, dedicated logic, programmable logic, microcode, etc.), software (e.g., instructions run on a processing device to perform hardware simulation), or a combination thereof. In one embodiment, the method 500 is performed by the main server 108 and the indexing servers 109 of FIG. 1.

Referring to FIG. 5, the method 500 begins with the processing logic 926 receiving a search request including one or more keywords (block 510). The search request may ask the main server 108 to identify the documents that contain the one or more keywords. For each keyword, the processing logic 926 hashes the keyword with multiple hash functions to generate a sequence of hash values (block 520). These hash functions are identical to the hash functions used during the setup phrase of FIG. 4. The processing logic 926 then uses the hash values to locate the chain of search indices that are stored at multiple locations (block 530). The nth hash value is used to locate the (n+1)th search index in the chain. The indexing server 109 that stores the last search index uses the last hash value to find the identifiers of the documents that contain the keyword (block 540). The operations of blocks 520-540 are repeated if there is more than one keyword in the search request.

Using the example "rat" that has hash values (73, 53, 236, 49), the processing logic 926 will look for entry 73 in the main search index 103, which provides a reference to a second search index (e.g., one of the federated search indices 104). The second search index is interrogated for 53, and the result provides another reference to a third search index (e.g., one of the federated search indices 104). The third search index is interrogated for 236, and the result provides a final reference to a last search index (e.g., one of the federated search indices 104). The last search index is interrogated for 49 to produce a final result. The final result is a list of document identifiers for the documents that contain the word "rat."

When there is more than one keyword in the search request, multiple sets of identifiers are produced, with one set for each keyword. The processing logic 926 then takes the intersection of the multiple sets of identifiers to produce a final search result (block 550). The final search result includes the document identifiers that contain all of the keywords in the search request.

In one embodiment, the search request may also contain one or more negative keywords. A negative keyword is used to exclude the documents that contain the negative keywords. If there is a negative keyword in the search request (block 560), the processing logic 926 hashes the negative keyword with multiple hash functions, and uses the hash values and the search indices to find identifiers of the documents that contain the negative keywords (block 570). The operation for negative keywords is identical to the operation for normal keywords at blocks 520-540. If there are multiple negative keywords in the search request, the operations of block 570 are repeated for each of the negative keywords. The identifiers obtained at block 570 are then excluded from the identifiers obtained at block 550 to generate the final search result (block 580). The final search result is returned to the user sending the search request (block 590).

The search results generated in FIG. 5 do not preserve the ordering of the keywords in a search request. In one embodiment, the search indices (e.g., the main search index 103 and the federated search indices 104 of FIG. 1) can be set up to generate a search result that preserves the ordering of the keywords in the search request. That is, a search phrase containing a keyword pair, such as "birthday boy," will generate a search result that is different from a search phrase containing "boy birthday." The search indices can be set up such that they enable document searches by keywords without necessarily storing the keywords themselves.

Referring back to FIG. 1, in one embodiment, the search indices (e.g., the main search index 103 and the federated search indices 104) can be set up such that documents are indexed by key phrases, with each key phrase including a keyword pair (i.e., two keywords). In one embodiment, each keyword pair can be hashed as one individual keyword. That is, if three hash functions are used to hash a keyword, hashing the keyword pair will result in three hash values. Thus, the method 400 of FIG. 4 can be used to index documents containing a keyword pair, and the method 500 of FIG. 5 can be used to search for documents containing the keyword pair. This embodiment can be extended to a key phrase that includes more than two keywords, with all of the keywords in the key phrase being hashed as one individual word.

In another embodiment to be described with reference to FIGS. 6-8, the search indices can be looked up by hash vector pairs, with each pair computed from a keyword pair. The first vector in the hash vector pair is the hash values of a first keyword, and the second vector in the pair is the hash values of a second keyword. Each of the first and second keywords is hashed by multiple hash functions. The level of hash for each keyword is not necessarily the same. The second keyword and the first keyword are correlated in the sense that the second keyword follows the first keyword in the document by a small distance. The limit to this distance is referred to as the "adjacency factor." When a search request including the first keyword and the second keyword is received, the search indices can be used to return the identifiers of the documents that contain the first keyword and the second keyword, in that order, separated by a distance no greater than the adjacency factor.

For example, a user searching for "zebra handbag" is likely to want documents or Web pages that include the phrase "zebra striped handbag," too. The system of FIG. 1 can be set up such that it returns a search result including the identifiers of the documents containing "zebra handbag," "zebra striped handbag," and "zebra print handbag," as well as any documents containing "zebra" and "handbag," in that order, separated by a distance no greater than a predetermined adjacency factor.

Continuing with the above example, assume that document #1 contains the phrase "zebra striped and zebra print handbags." With an adjacency factor of 5, the following pairs of keywords can be generated: "zebra striped", "zebra and", "zebra zebra", "zebra print", "zebra handbags", "striped and", "striped zebra", "striped print", "striped handbags", "and zebra", "and print", "and handbags". In one embodiment, the document analyzer 204 (FIG. 2) of the main server 108 analyzes each document to be indexed to generate the pair of keywords. Each of these keyword pairs is associated with the same document (that is, document #1). The hash unit 204 hashes each keyword in the pair with multiple hash functions to produce a hash vector. Thus, each keyword pair corresponds to a hash vector pair, which is used to form a chain of search indices. The pair of hash vectors can be stored in a hierarchical, reference-oriented and distributed fashion, with the last hash value from the first keyword providing a reference to the first hash value for the second keyword.

Figure 6:
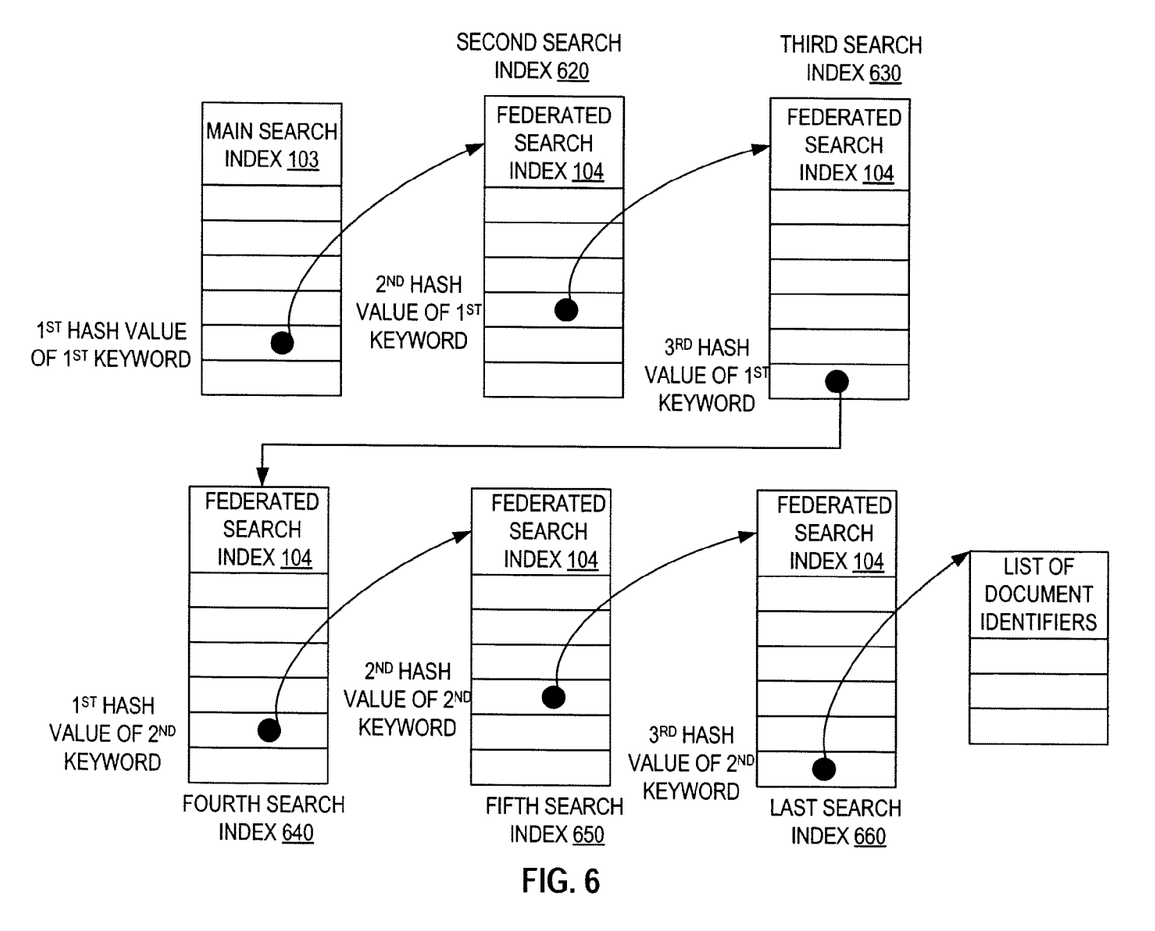
FIG. 6 illustrates an example of a chain of search indices that corresponds to an ordered keyword pair in accordance with one embodiment of the invention.

FIG. 6 illustrates an example of forming a chain of search indices using a hash vector pair computed from a keyword pair. The first hash value of the first hash vector is used to look up an entry in the main search index 103, where the entry provides a reference to the storage location of a second search index 620. The second hash value of the first hash vector is used to look up an entry in the second search index 620, and that entry provides a reference to the storage location of a third search index 630. The third hash value of the first hash vector is used to look up an entry in a third search index 630, and that entry provides a reference to the storage location of a fourth search index 640. The fourth search index 640 is indexed by the first hash value of the second hash vector. The second hash value of the second hash vector is used to look up an entry in the fourth search index 640, and that entry provides a reference to the storage location of a fifth search index 650. Following the chain to a last search index 660, the entry pointed to by the third hash value of the second hash vector stores or points to a list of document identifiers that contains the keyword pair. Each of the second, third, fourth, fifth, and last search indices 620-660 can be any one of the federated search indices 104. Although three hash values are shown for each keyword in FIG. 6, it is understood that any number of hash values can be used to form a chain of search indices that are stored in multiple storage locations. The level of hashes for the first keyword is not necessarily the same as the level of hashes for the second keyword.

Figure 7:
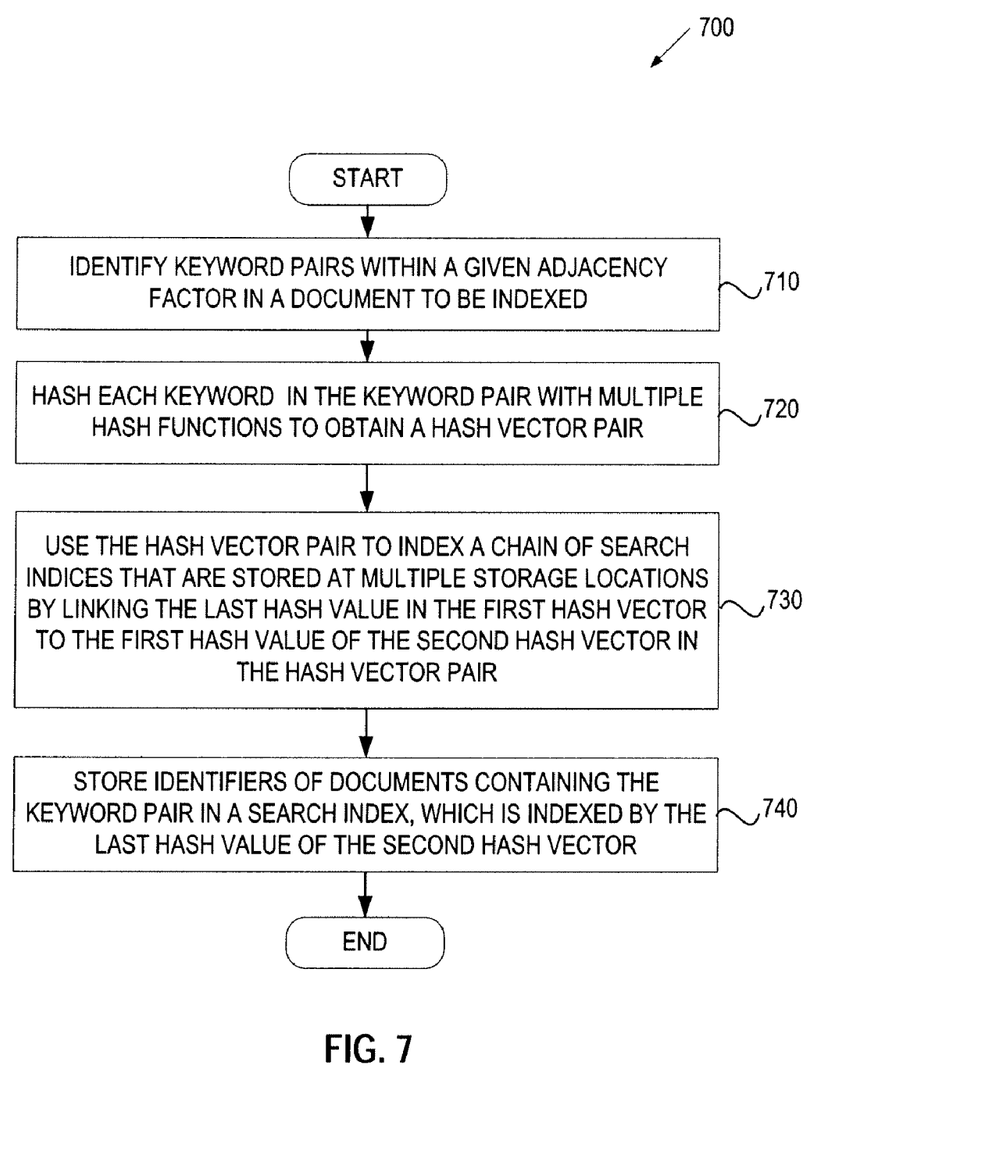
FIG. 7 is a flow diagram of one embodiment of a method for setting up search indices to facilitate document search that preserves the ordering of the keywords.

FIG. 7 is a flow diagram of one embodiment of a method 700 for setting up the search indices for document search while preserving the order of a keyword pair. The method 700 may be performed by processing logic 926 of FIG. 9 that may comprise hardware (e.g., circuitry, dedicated logic, programmable logic, microcode, etc.), software (e.g., instructions run on a processing device to perform hardware simulation), or a combination thereof In one embodiment, the method 700 is performed by the main server 108 of FIG. 1.

Referring to FIG. 7, the method 700 begins with the processing logic 926 extracting keyword pairs from a document to be indexed (block 710). For each keyword pair, the two keywords in the document are separated by a distance no greater than a predetermined adjacency factor. For each individual keyword, the processing logic 926 hashes the keyword with multiple hash functions to generate a hash vector (block 720). The number of elements in the hash vector is equal to the number of hash functions used to hash the corresponding keyword. Thus, each keyword pair is hashed into a hash vector pair. The hash vector pair is used to index a chain of search indices that are stored at multiple storage locations (block 730), such that the last hash value of the first hash vector in the pair is linked to the first hash value of the second hash vector in the pair. The lookup result for the nth hash value provides the location to search for the (n+1)th hash value. The processing logic 926 then stores the identifiers of the document in the entry of the last search index, where the entry is pointed to by the last hash value of the second hash vector (block 740). The operations of blocks 720-740 can be repeated for each keyword pair extracted from the document. The processing logic 926 may continue to index the next document until all of the documents are processed.

In one embodiment, the distance between the two keywords is stored with the identifier of the document. This distance can be used to provide information for ordering a search result. For example, someone searching for "zebra handbag" may want to see all of the documents with "zebra" and "handbag," in order and directly adjacent, before the documents where "zebra" and "handbag" are separated by one or more words. In one embodiment, the processing of keyword pairs can be combined with the processing of individual keywords. Thus, the documents with "zebra" and "handbag," in order and directly adjacent will be presented in the search result before those documents that contain the words "zebra" and "handbag", but not necessarily adjacent and not necessarily in order.

Figure 8A:
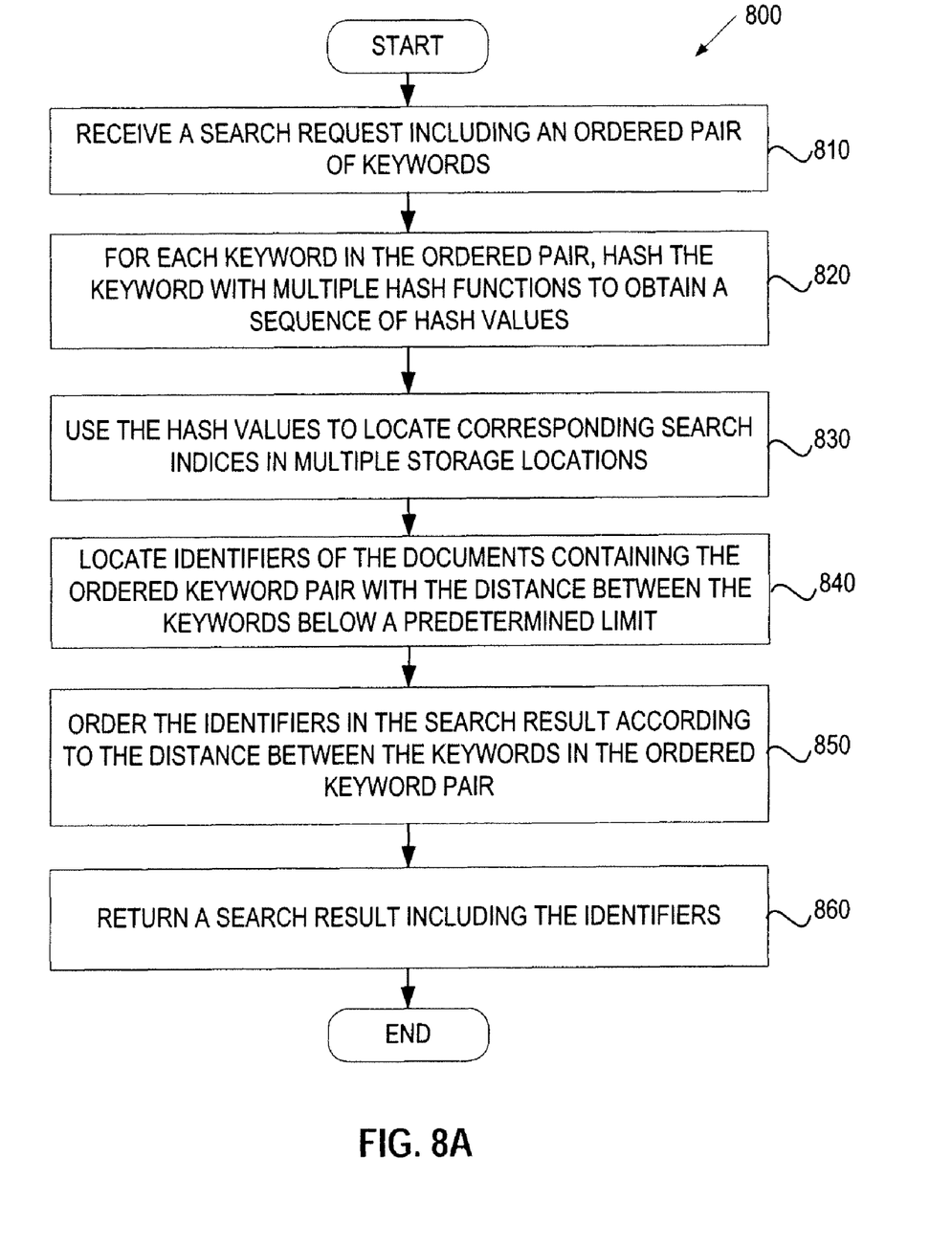
FIG. 8A is a flow diagram of one embodiment of a method for performing document search using an ordered keyword pair and the search indices that are set up in FIG. 7.

FIG. 8A is a flow diagram of one embodiment of a method 800 for performing a document search in response to a search request that includes a keyword pair. The method 800 may be performed by processing logic 926 of FIG. 9 that may comprise hardware (e.g., circuitry, dedicated logic, programmable logic, microcode, etc.), software (e.g., instructions run on a processing device to perform hardware simulation), or a combination thereof. In one embodiment, the method 800 is performed by the main server 108 and the indexing servers 109 of FIG. 1.

Referring to FIG. 8A, the method 800 begins with the processing logic 926 receiving a search request including an ordered pair of keywords (block 810). The search request may ask the main server 108 to identify the documents that contain the ordered pair of keywords.

For each keyword in the pair, the processing logic 926 hashes the keyword with multiple hash functions to generate a hash vector (block 820). These hash functions are identical to the hash function used during the setup phrase of FIG. 7. A hash vector pair is generated from the keyword pair. The processing logic 926 then uses the hash vector pair as a sequence of hash values to locate the chain of search indices that are stored at multiple locations (block 830). The nth hash value in the sequence is used to locate the (n+1)th search index in the chain. The last hash value of the first hash vector provides a reference to the search index that is indexed by the first hash value of the second hash vector. The indexing server 109 that stores the last search index in the chain uses the last hash value of the sequence (i.e., the last hash value of the second hash vector) to locate the identifiers of the documents that contain the keyword pair (block 840).

In one embodiment where the distance between keywords are stored with the document identifiers, the list of document identifiers produced at block 840 can be presented as an ordered list according to the distance between the two keywords in the search request (block 850). Thus, the documents having the two keywords immediately adjacent to each other will be presented before the documents that contain the two keywords separated by one or more words, and before the documents that contain the two keywords that are not in the same order as the search request. A search result containing the document identifiers is returned to the user who sends the search request (block 860).

In one embodiment, the search indices can be set up to search for ordered n-tuples by iteratively searching for adjacent ordered pairs from the n-tuples. For example, in response to a search phrase "apple pie recipes", a search can be performed by looking for a first list of document identifiers that match "apple pie", and a second list of document identifiers that match "pie recipes". Identifiers of the documents that are in both the first and second lists are likely, but not guaranteed, to contain the triplet "apple pie recipes". The document identifiers that are in the intersection of the lists, but do not contain the n-tuple search phrase (e.g., "apple pie recipes"), are referred to as "false positives".

False-positive matches can be reduced at the cost of more storage space. In one embodiment, two sets of search indices (e.g., index tables) can be created; one set using a small adjacency factor, and the other set using a larger adjacency factor (e.g., twice that of the first set). A search can be performed for the adjacent keyword pairs using the first set of tables, and another search can be performed for non-adjacent keyword pairs in the second set of tables. For the "apple pie recipes" example, the adjacent keyword pairs "apple pie" and "pie recipes" can be searched in the first set of tables to produce a first list and a second list, respectively, and the non-adjacent keyword pair "apple recipes" can be searched in the second set to produce a third list. The document identifiers that are in all three lists are likely to contain the the triplet "apple pie recipes" with a low probability of having false positives.

In one embodiment, the second set of tables can omit storing the immediately adjacent keyword pairs to reduce its storage size. That is, searching the second set of tables for "apple pie" will not return documents where "apple" and "pie" are adjacent.

In an example where the search phrase includes a quadruplets, more than one non-adjacent keyword pairs can be searched to further reduce the false positives. For example, if the search phrase is "stock car racing memorabilia", the first set of tables can be searched for "stock car", "car racing" and "racing memorabilia". The second set of tables can be searched for "stock racing" and "car memorabilia". These additional searches can help to reduce the false positives.

Figure 8B:
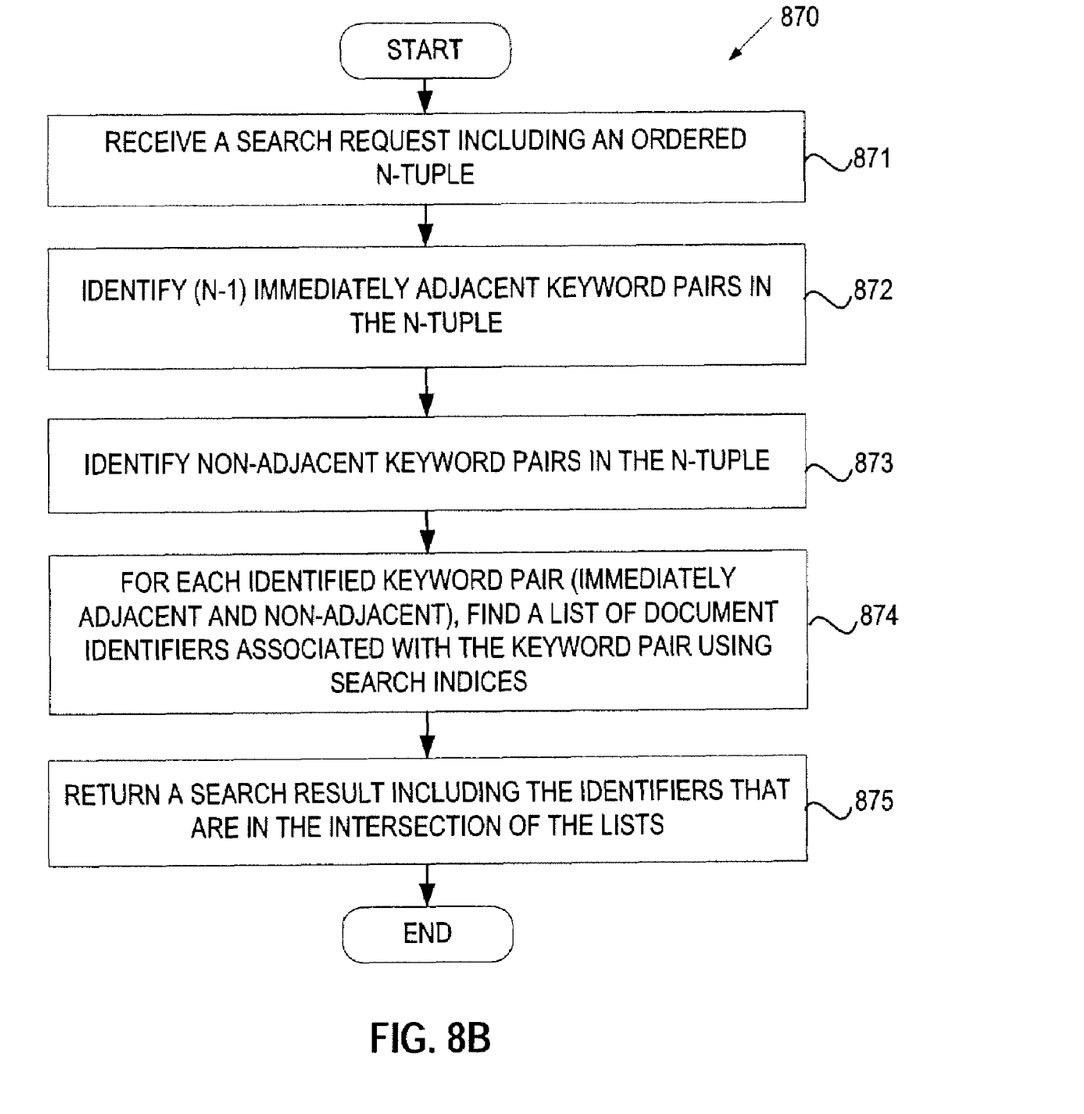
FIG. 8B is a flow diagram of another embodiment of a method for performing document search using an ordered n-tuple as a search phrase.

FIG. 8B is a flow diagram of one embodiment of a method 870 for performing a document search in response to a search request that includes n-tuple of ordered keywords. The method 870 may be performed by processing logic 926 of FIG. 9 that may comprise hardware (e.g., circuitry, dedicated logic, programmable logic, microcode, etc.), software (e.g., instructions run on a processing device to perform hardware simulation), or a combination thereof. In one embodiment, the method 800 is performed by the main server 108 and the indexing servers 109 of FIG. 1.

Referring to FIG. 8B, the method 870 begins with the processing logic 926 receiving a search request including an n-tuple of ordered keywords (block 871). The search request may ask the main server 108 to identify the documents that contain the n-tuple of ordered keywords.

The processing logic 926 identifies (N-1) immediately adjacent keyword pairs in the n-tuple (block 872) and identifies non-adjacent keyword pairs in the n-tuple (block 873). The number of non-adjacent keyword pairs depends on a predetermined adjacency factor that is used to set up the second set of index tables as described above. For example, ordered quadruplet and an adjacency factor of two will produce two non-adjacent keyword pairs. For each keyword pair identified at blocks 872 and 873, the processing logic 926 finds a list of document identifiers associated with the keyword pair (block 874). The processing logic 926 can find the lists of document identifiers using the method 800 of FIG. 8A. The processing logic 926 then returns a search result containing the document identifiers in the intersection of the lists found at block 874 (block 875).

In some embodiments, the method 870 of FIG. 8B can be further enhanced by allowing one or more negative key phrases to be excluded from the search result of block 875. A key phrase is an ordered n-tuple of keywords. A negative key phrase is an ordered n-tuple of keywords that does not appear in any documents identified by the search result. Identifiers of the documents containing a negative key phrase will be removed from the search result. For example, a search can be conducted for "great pie recipes", and a first list of document identifiers can be created. Another search can be conducted for "apple pie recipes", and a second list of document identifiers can be created. The final list can be created by removing from the first list the identifiers in the second list that are also in the first list.

Figure 9:
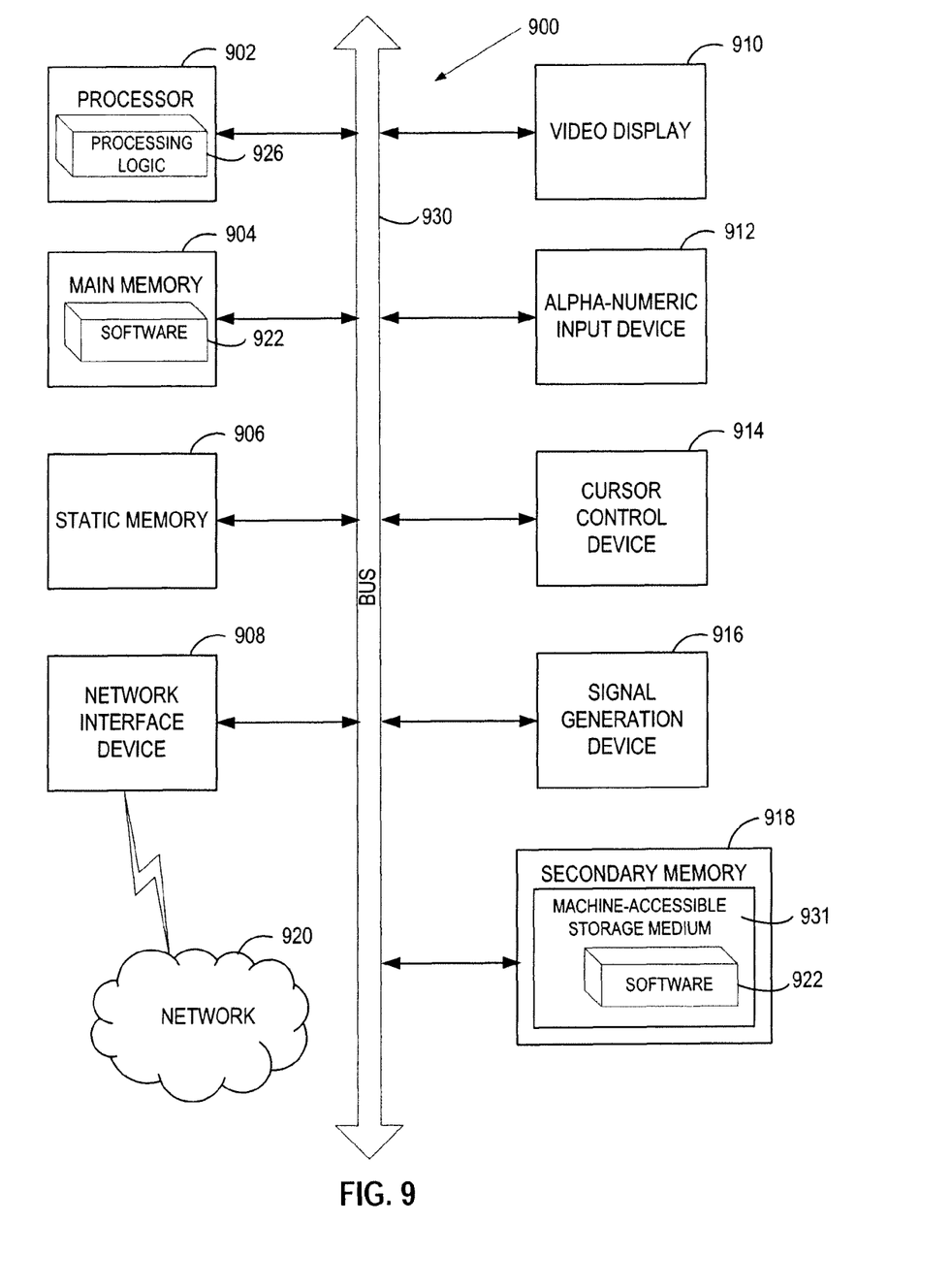
FIG. 9 illustrates a diagrammatic representation of a machine in the exemplary form of a computer system.

FIG. 9 illustrates a diagrammatic representation of a machine in the exemplary form of a computer system 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

The processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute the processing logic 926 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-readable storage medium (or more specifically a computer-readable storage medium) 931 on which is stored one or more sets of instructions (e.g., software 922) embodying any one or more of the methodologies or functions described herein. The software 922 may also reside, completely or at least partially, within the main memory 904 and/or within the processing device 902 during execution thereof by the computer system 900; the main memory 904 and the processing device 902 also constituting machine-readable storage media. The software 922 may further be transmitted or received over a network 920 via the network interface device 908.

The machine-readable storage medium 931 may also be used to store the main search index 103 or the federated search indices 104 (FIG. 1). While the machine-readable storage medium 931 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method, comprising:
   receiving, by a computer system, a search request including an ordered pair of keywords;
   hashing, by the computer system, each keyword with a plurality of hash functions to obtain a hash vector pair that includes a first hash vector and a second hash vector;
   using, by the computer system, the hash vector pair to locate a chain of search indices that are stored across a plurality of storage locations;
   determining, by the computer system, from a search index in the chain, identifiers of documents containing the ordered pair of keywords, with a distance between the keywords in the documents below a predetermined limit; and returning, by the computer system, a search result containing the identifiers.

2. The method of claim 1, further comprising:
ordering the identifiers in the search result according to the distance between the keywords in the ordered pair.

3. The method of claim 1, wherein a last hash value of the first hash vector provides a reference to a storage location of search index that uses the first hash value of the second hash vector as a key.

4. The method of claim 1, wherein a last hash value of the second hash vector points to an entry in the last search index in the chain, the entry providing a reference to the identifiers of the documents that contain the ordered pair of keywords.

5. The method of claim 1, wherein the search request includes a key phrase, the method further comprising:
identifying immediately adjacent keyword pairs in the key phrase;
identifying non-adjacent keyword pairs in the key phrase;
for each identified keyword pair, finding a list of identifiers to produce a plurality of lists; and
returning the search result containing the identifiers that are in an intersection of the plurality of lists.

6. The method of claim 1, wherein the search request includes at least one negative key phrase and at least one other key phrase, the method further comprising:
determining a first list of document identifiers using the at least one negative key phrase;
determining a second list of document identifiers using the at least one other key phrase;
removing from the second list the document identifiers that are also in the first list; and
generating the search result including the identifiers of documents that contain the at least one other key phrase and do not contain the at least one negative key phrase.

7. A computer readable storage medium including instructions that, when executed by a processing system, cause the processing system to perform a method comprising:
receiving a search request including an ordered pair of keywords;
hashing each keyword with a plurality of hash functions to obtain a hash vector pair that includes a first hash vector and a second hash vector;
using the hash vector pair to locate a chain of search indices that are stored across a plurality of storage locations;
determining, from a search index in the chain, identifiers of documents containing the ordered pair of keywords, with a distance between the keywords in the documents below a predetermined limit; and
returning a search result containing the identifiers.

8. The computer readable storage medium of claim 7, wherein the method further comprises:
ordering the identifiers in the search result according to the distance between the keywords in the ordered pair.

9. The computer readable storage medium of claim 7, wherein a last hash value of the first hash vector provides a reference to a storage location of search index that uses the first hash value of the second hash vector as a key.

10. The computer readable storage medium of claim 7, wherein a last hash value of the second hash vector points to an entry in the last search index in the chain, the entry providing a reference to the identifiers of the documents that contain the ordered pair of keywords.

11. The computer readable storage medium of claim 7, wherein the search request includes at least one negative key phrase and at least one other key phrase, the method further comprising:

determining a first list of document identifiers using the at least one negative key phrase;
determining a second list of document identifiers using the at least one other key phrase;
removing from the second list the document identifiers that are also in the first list; and
generating the search result including the identifiers of documents that contain the at least one other key phrase and do not contain the at least one negative key phrase.

12. A system comprising:
data storage to store a main search index; and
a main server coupled to the data storage to receive a search request including an ordered pair of keywords, hash each keyword with a plurality of hash functions to obtain a hash vector pair that includes a first hash vector and a second hash vector, perform a search based on the main search index, a first hash vector and a second hash vector, and return a search result to include identifiers of documents that contain the ordered pair of keywords, with a distance between the keywords in the documents below a predetermined limit.

13. The system of claim 12, further comprising:
a plurality of indexing servers coupled to the main server, the indexing servers use the hash vector pair to locate a chain of search indices stored across a plurality of data storage and to determine the search result.

14. A computer-implemented method, comprising:
extracting, by a computer system, a keyword pair from a document, the keyword pair including a first keyword followed by a second keyword, a distance between the first keyword and the second keyword being smaller than a predetermined factor;
calculating, by the computer system, a first hash vector for the first keyword and a second hash vector for the second keyword using a plurality of hash functions to obtain a sequence of hash values; and
distributing, by the computer system, a plurality of search indices across a plurality of storage locations that can be located by the sequence of hash values.

15. The method of claim 14, wherein each search index is indexed by a corresponding hash value in the sequence, a last hash value of the first hash vector providing a reference to a storage location of the search index that uses the first hash value of the second hash vector as a key.

16. The method of claim 14, wherein a last hash value of the second hash vector provides a reference to an identifier of the document.

17. The method of claim 14, wherein extracting a keyword pair from a document further comprises:
preserving an order of the first keyword and the second keyword in the keyword pair.

18. The method of claim 14, wherein distributing a plurality of search indices further comprises:
distributing a first set of the search indices associated with immediately adjacent keyword pairs in a key phrase extracted from the document; and
distributing a second set of the search indices associated with non-adjacent keyword pairs in the key phrase.

19. A computer readable storage medium including instructions that, when executed by a processing system, cause the processing system to perform a method comprising:
extracting a keyword pair from a document, the keyword pair including a first keyword followed by a second keyword, a distance between the first keyword and the second keyword being smaller than a predetermined factor;

calculating a first hash vector for the first keyword and a second hash vector for the second keyword using a plurality of hash functions to obtain a sequence of hash values; and distributing a plurality of search indices across a plurality of storage locations that can be located by the sequence of hash values.

20. The computer readable storage medium of claim 19, wherein each search index is indexed by a corresponding hash value in the sequence, a last hash value of the first hash vector providing a reference to a storage location of the search index that uses the first hash value of the second hash vector as a key.

21. The computer readable storage medium of claim 19, wherein a last hash value of the second hash vector provides a reference to an identifier of the document.

22. The computer readable storage medium of claim 19, wherein extracting a keyword pair from a document further comprises:

preserving an order of the first keyword and the second keyword in the keyword pair.

* * * * *